(12) United States Patent
Schmid

(10) Patent No.: US 11,161,394 B2
(45) Date of Patent: Nov. 2, 2021

(54) AIR OUTLET DEVICE FOR FEEDING AIR INTO A VEHICLE INTERIOR IN A DIRECTIONALLY CONTROLLED MANNER

(71) Applicant: Bayerische Motoren Werke Aktiengesellschaft, Munich (DE)

(72) Inventor: Bernhard Schmid, Unterfoehring (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 163 days.

(21) Appl. No.: 16/286,831

(22) Filed: Feb. 27, 2019

(65) Prior Publication Data
US 2019/0193525 A1    Jun. 27, 2019

Related U.S. Application Data

(63) Continuation of application No. PCT/EP2017/074244, filed on Sep. 25, 2017.

(30) Foreign Application Priority Data

Sep. 26, 2016    (DE) ..................... 10 2016 218 456.3

(51) Int. Cl.
*B60H 1/34*    (2006.01)

(52) U.S. Cl.
CPC ... *B60H 1/3421* (2013.01); *B60H 2001/3464* (2013.01); *B60H 2001/3471* (2013.01)

(58) Field of Classification Search
CPC ...... B60H 1/34; B60H 1/3414; B60H 1/3421; B60H 1/3464; B60H 2001/3471; B60H 2001/3478
USPC .......................................... 454/152–153, 155
See application file for complete search history.

(56) References Cited

U.S. PATENT DOCUMENTS

| | | | | |
|---|---|---|---|---|
| 3,901,275 A | * | 8/1975 | Logsdon | ................. F24F 13/15 137/599.03 |
| 3,973,590 A | * | 8/1976 | Logsdon | ................. F16K 11/16 137/599.03 |
| 4,664,022 A | * | 5/1987 | Oddenino | ............ B60H 1/3414 454/155 |

(Continued)

FOREIGN PATENT DOCUMENTS

| | | |
|---|---|---|
| CN | 1160838 A | 10/1997 |
| CN | 1164004 A | 11/1997 |

(Continued)

OTHER PUBLICATIONS

International Search Report (PCT/ISA/210) issued in PCT Application No. PCT/EP2017/074244 dated Dec. 15, 2017 with English translation (four (4) pages).

(Continued)

*Primary Examiner* — Vivek K Shirsat
*Assistant Examiner* — Ko-Wei Lin
(74) *Attorney, Agent, or Firm* — Crowell & Moring LLP

(57) ABSTRACT

An air outlet device for feeding air into a vehicle interior in a directionally controlled manner is provided. The air outlet device has an air channel, a first pivotable air-guiding element, and a second pivotable air-guiding element. The first air-guiding element and the second air-guiding element, together with an air outlet opening, form an air outlet nozzle. The first air-guiding element and the second air-guiding element are configured to be not pivotable in the same direction.

11 Claims, 3 Drawing Sheets

(56) References Cited

U.S. PATENT DOCUMENTS

| | | | | |
|---|---|---|---|---|
| 5,738,580 | A | * | 4/1998 | Baek .................... F24F 13/075 454/153 |
| 5,766,069 | A | * | 6/1998 | Baek .................... B60H 1/345 454/153 |
| 2011/0028081 | A1 | * | 2/2011 | Hopkins ............ H05K 7/20745 454/259 |
| 2016/0152116 | A1 | * | 6/2016 | Albin ................... B60H 1/3421 454/155 |
| 2017/0158029 | A1 | | 6/2017 | Eltrop |

FOREIGN PATENT DOCUMENTS

| CN | 102012083 A | 4/2011 |
|---|---|---|
| CN | 105644302 A | 6/2016 |
| DE | 102 02 925 A1 | 7/2003 |
| DE | 10 2005 037 748 B3 | 2/2007 |
| DE | 10 2006 001 798 A1 | 7/2007 |
| DE | 10 2009 020 574 B3 | 7/2010 |
| DE | 10 2007 036 532 B4 | 4/2011 |
| DE | 10 2010 035 079 A1 | 2/2012 |
| DE | 10 2014 216 573 A1 | 2/2016 |
| DE | 10 2014 221 641 A1 | 4/2016 |
| JP | 2008-149830 A | 7/2008 |

OTHER PUBLICATIONS

German-language Written Opinion (PCT/ISA/237) issued in PCT Application No. PCT/EP2017/074244 dated Dec. 15, 2017 (five (5) pages).

German-language Search Report issued in counterpart German Application No. 10 2016 218 456.3 dated Apr. 13, 2017 with partial English translation (13 pages).

English translation of Chinese-language Office Action issued in Chinese Application No. 201780054853.5 dated Aug. 4, 2021 (nine (9) pages).

* cited by examiner

AIR OUTLET DEVICE FOR FEEDING AIR INTO A VEHICLE INTERIOR IN A DIRECTIONALLY CONTROLLED MANNER

CROSS REFERENCE TO RELATED APPLICATIONS

This application is a continuation of PCT International Application No. PCT/EP2017/074244, filed Sep. 25, 2017, which claims priority under 35 U.S.C. § 119 from German Patent Application No. 10 2016 218 456.3, filed Sep. 26, 2016, the entire disclosures of which are herein expressly incorporated by reference.

BACKGROUND AND SUMMARY OF THE INVENTION

The present invention relates to an air outlet device for feeding air into a vehicle interior in a directionally controlled manner including an air duct, a first pivotable air guiding element and a second pivotable air guiding element.

DE 10 2014 216 573 A1 has disclosed an air outlet device for feeding air to a vehicle interior in a controlled manner. The air outlet device has an air outlet opening which is connected via pivotable wall sections to a duct element which can be moved transversely with respect to the air flow direction. Together with the air outlet opening, the pivotable wall sections form an air outlet nozzle and can be pivoted merely in the same direction in a manner which corresponds to the movement of the duct section in the transverse direction.

Furthermore, DE 10 2014 221 641 A1 discloses an air flow regulating nozzle having outer louvers which are configured such that they can be pivoted in the same direction into different angular positions in order to deflect the air flow upward, or downward or into the middle. The upper outer louver and the lower outer louver are pivoted in each case by the same angle, with the result that the air guiding faces of the two outer louvers are configured in each case parallel to one another.

In the case of the louvers which can be pivoted in the same direction for the deflection of air in accordance with the prior art, an air outlet quantity is reduced, in particular, in the region with a great air deflection.

It is an object of the present invention to provide an air outlet device for feeding air into a vehicle interior in a directionally controlled manner, which air outlet device enables an air outlet quantity which is as great as possible in an overall air deflecting range of the air outlet device.

This and other objects are achieved by way of an air outlet device in accordance with embodiments of the present invention.

The air outlet device according to an embodiment of the invention for feeding air into a vehicle interior in a directionally controlled manner includes an air duct, a first pivotable air guiding element and a second pivotable air guiding element. The first air guiding element and the second air guiding element form, together with an air outlet opening, an air outlet nozzle. The first air guiding element and the second air guiding element are configured such that they can be pivoted in opposite directions.

In accordance with the present invention, the term "in opposite directions" relates to a directional specification, that is to say the first air guiding element and the second air guiding element can be pivoted in such a way that they are not pivotable in the same direction. In other words, in the case of pivoting of the first air guiding element by a defined angle for air deflection or directional control of the air, the second air guiding element is pivoted by a different angle or is not pivoted at all.

In particular, in the case of pivoting of the first air guiding element or the second air guiding element by a predefined angle, the second air guiding element or the first air guiding element, respectively, is pivoted by an angle which is smaller than the predefined angle. Here, the air deflection takes place substantially by way of the air guiding element which is pivoted by the predefined angle, that is to say the greater angle.

In accordance with a preferred embodiment of the invention, the first air guiding element and the second air guiding element are configured adjacently with respect to the air outlet opening.

As a result, the nozzle action of the air outlet device and the directional control of the air are improved.

Furthermore, the first air guiding element and the second air guiding element are preferably pivotable about two axes which are spaced apart and parallel to one another. The axes can be real or virtual axes.

As a result of the parallel arrangement, the directional control of the air over an air deflecting range, for example from left to right or from top to bottom, is simplified.

The axis, about which the first air guiding element is pivotable, and the axis, about which the second air guiding element is pivotable, are preferably configured or arranged close to the air outlet opening, that is to say so as to adjoin the air outlet opening directly. In particular, the axis, about which the first air guiding element is pivotable, is configured at one end of the first air guiding element in the air flow direction. In an analogous manner, the axis, about which the second air guiding element is pivotable, is configured at one end of the second air guiding element in the air flow direction.

The air outlet device preferably has precisely two air guiding elements which are configured parallel to each other. Therefore, no further air guiding element is advantageously arranged between the first air guiding element and the second air guiding element which form an air guiding element pair. This does not preclude a plurality of air guiding elements being arranged next to one another in the transverse direction of the air outlet opening. For example, a first air guiding element pair might be adjoined in the transverse direction of the air outlet opening by a further air guiding element pair. The air outlet device particularly preferably has precisely two air elements at the air outlet opening, however.

In accordance with one development of the air outlet device according to the invention, the first air guiding element and the second air guiding element are pivotable between a rest position and a multiplicity of air guiding positions. The rest position is a position which tends to have a neutral or non-restrictive air guiding function as a starting position or end position of the air guiding element. In the rest position, the respective air guiding element restricts an air quantity as little as possible. In the air guiding positions, the actual direction of the exiting air is predefined by way of the first air guiding element or the second air guiding element.

The first air guiding element and the second air guiding element are advantageously pivoted to a maximum extent in the direction of a wall of the air duct in the rest position. In other words, the first air guiding element and the second air guiding element have a maximum deflection in the direction of the wall in the respective rest position and, as a result, restrict an air throughput as little as possible in the duct as far as the air outlet opening.

Here, the first air guiding element and the second air guiding element are preferably in contact with the wall of the air duct in their respective rest position. As a result, the maximum deflection of the respective air guiding element is possible with a minimum restriction of the air throughput.

The first air guiding element and the second air guiding element are advantageously prestressed in the direction of the rest position, for example by way of a spring device.

In accordance with one preferred development of the present invention, in each case one of the first air guiding element and the second air guiding element is pivotable into its air guiding positional range in order to control the direction of the air outlet flow, whereas the other one of the first air guiding element and the second air guiding element is situated in its rest position.

As a result, in each case merely one of the air guiding elements serves as a directionally guiding element, whereas the other air guiding element restricts the air duct as far as the air outlet opening as little as possible in its rest position.

In the case of the air outlet device according to the invention, a height of the air duct is preferably greater than a height of the air outlet opening. As a result, the nozzle action is boosted and directional control by way of the air guiding elements is improved.

In accordance with a further preferred development of the air outlet device, an air guiding device can be provided in the air duct upstream of the first air guiding element and the second air guiding element in the flow direction, which air guiding device is adapted to change an air flow direction in the air duct.

As a result, it is possible to perform a further air flow directional change in addition to the air guiding direction which is defined by way of the first air guiding element and/or the second air guiding element. For example, the air guiding device can change the air flow direction in a direction transversely with respect to the air outlet nozzle which is configured by way of the first air guiding element and the second air guiding element, that is to say transversely with respect to the pivoting direction of the first air guiding element and the second air guiding element.

Here, the air guiding device can preferably have louvers which can be pivoted transversely with respect to a pivoting direction of the first air guiding element and the second air guiding element. Here, the louvers can preferably be pivoted in a direction perpendicularly with respect to the pivoting direction of the first air guiding element and the second air guiding element.

As a result, the direction of an exiting air flow can be changed in a varied manner by way of the air outlet device.

In addition to the first air guiding element and the second air guiding element, no further air guiding element is preferably situated in the air outlet nozzle and/or in the duct section, in which the first air guiding element, the second air guiding element and the air outlet opening are arranged.

The vehicle interior can be a constituent part of a motor vehicle, for example a passenger car or truck. The invention can also be used, however, in an aircraft or ship or a rail-borne vehicle.

Developments of the invention which are mentioned in the preceding text can be combined with one another in any desired manner wherever possible and appropriate.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
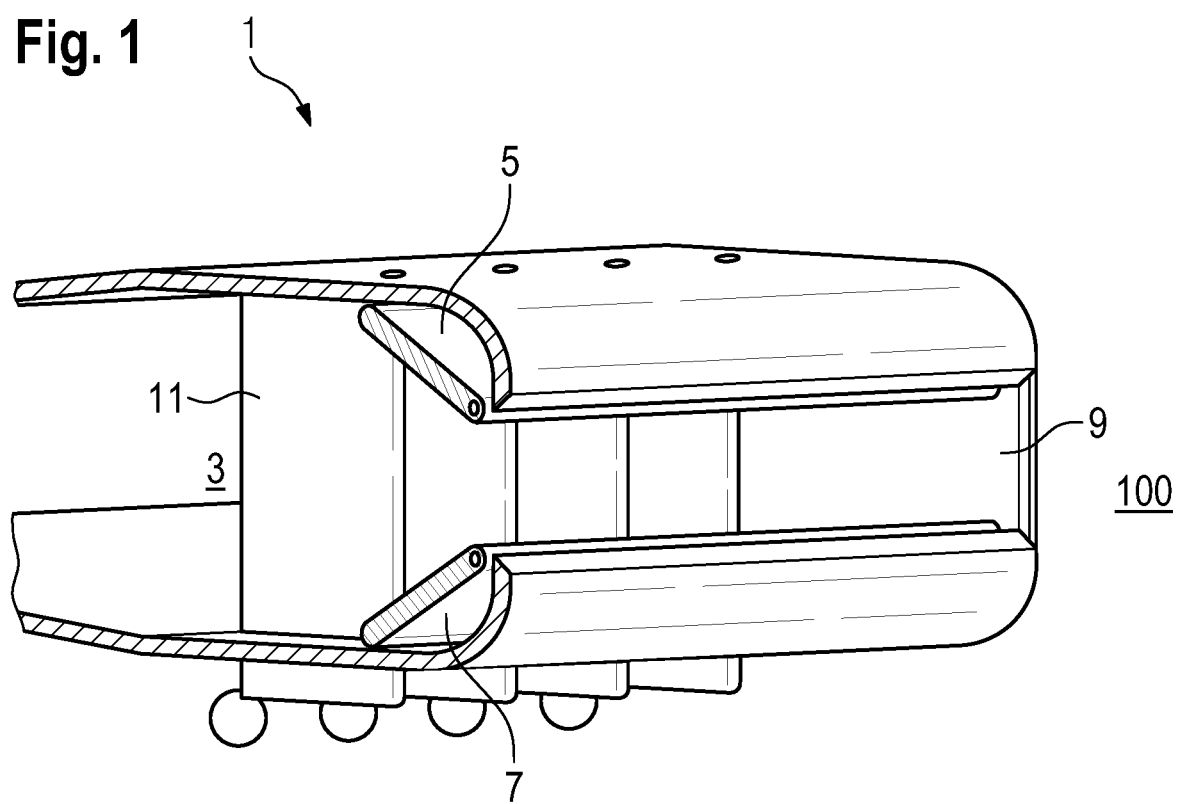
FIG. 1 is a diagrammatic, sectional perspective view of an air outlet opening in accordance with one exemplary embodiment of the present invention.

As shown in FIG. 1, an air outlet device 1 for feeding air into a vehicle interior 100 in a directionally controlled manner has an air duct 3 which opens in an air outlet opening 9, via which outflowing air passes into the vehicle interior 100. The outflowing air can be climate controlled or temperature controlled air from an air conditioning system or non-temperature controlled fresh air. The air outlet device 1 can be integrated, for example, into what is known as a dashboard of a passenger car or a truck, in particular in a middle region and/or a left hand or right hand region of the dashboard. The integration into a roof region or a floor region and a center console of the motor vehicle is fundamentally also possible, however. The air outlet opening 9 is configured as a rectangular slot which extends in the dashboard in the vehicle transverse direction in accordance with the exemplary embodiment. It is also possible, however, to install the air outlet device 1 into the dashboard in a manner which is rotated by 90°, with the result that the rectangular slot of the air outlet opening 9 extends substantially in the vehicle vertical direction in this case. The air outlet opening 9 is substantially wider than its height, with the result that it can be of inconspicuous design for the vehicle occupant and can be integrated tastefully into the dashboard. A small height of the air outlet opening, in the case of which the two air guiding elements 5 and 7 lie close to one another, additionally makes improved air directional control possible. Depending on the design specification for the vehicle interior 100, the air outlet opening 9 can also be of trapezoidal configuration (for example, in a manner which deviates from a rectangular shape). Together with a first upper pivotable air guiding element 5 and a second lower pivotable air guiding element 7, the air outlet opening 9 forms an air outlet nozzle. The first air guiding element 5 and the second air guiding element 7 are configured adjacently with respect to the air outlet opening 9, the first air guiding element 5 and the second air guiding element 7 being pivotable in each case about an associated axis which is situated close to the air outlet opening 9. The two pivot axes of the first air guiding element 5 and the second air guiding element 7 are arranged parallel to each other.

The air duct 3 has a greater cross section than the air outlet opening 9. In the present exemplary embodiment, in particular, the air duct 3 is configured to be higher in the vehicle vertical direction than the air outlet opening 9 and/or higher than the spacing between the pivot axis of the first air guiding element 5 and the pivot axis of the second air guiding element 7. An air guiding device having a plurality of louvers 11 is configured in the air duct 3 upstream of the air guiding elements 5 and 7 in the air flow direction, which louvers 11 can be pivoted in the same direction about in each case one associated axis, which axes run at an angle perpendicularly with respect to the pivot axes of the first air guiding element 5 and of the second air guiding element 7. In the present case, the louvers 11 can be pivoted about in each case one axis which runs substantially in the vehicle vertical direction. The air guiding device having the louvers 11 serves to influence the flow direction of the air which exits into the vehicle interior 100 in the vehicle transverse direction. In contrast, the air guiding elements 5 and 7 serve to influence the direction of the exiting air into the vehicle interior 100 in the vehicle vertical direction. The louvers 11 are coupled to one another outside the air duct 3, in order to make joint, synchronous pivoting possible. For this purpose, a lever arm 15 is connected to each louver 11 below the air duct, which lever arm 15 is connected to the pivot axis of the associated louvers 11. At a free end of the lever arm 15, the louvers 11 are coupled to one another via a link which is not shown in the figures. The louvers 11 can therefore be rotated at the same time by way of a suitable manual or electric drive device.

Figure 2:
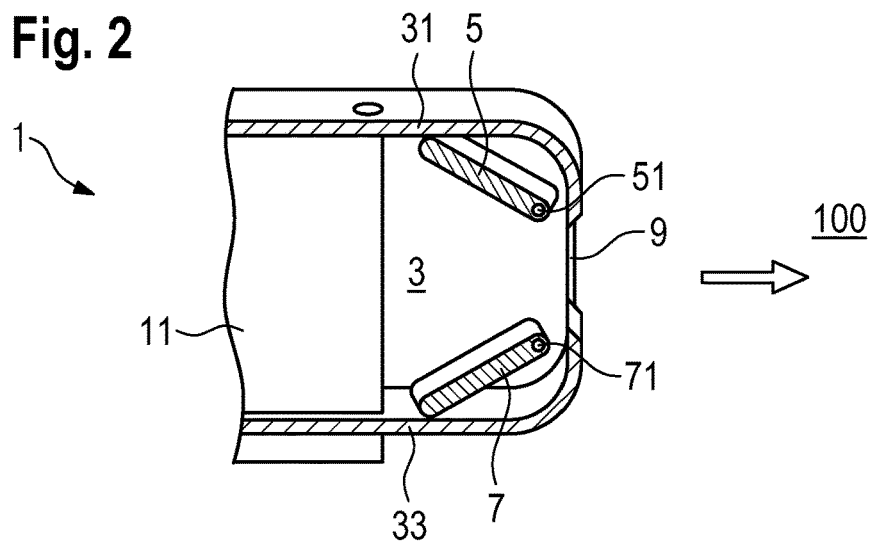
FIG. 2 is a diagrammatic sectional view of the air outlet device in accordance with the exemplary embodiment of the present invention in a first air guiding position.
Figure 3:
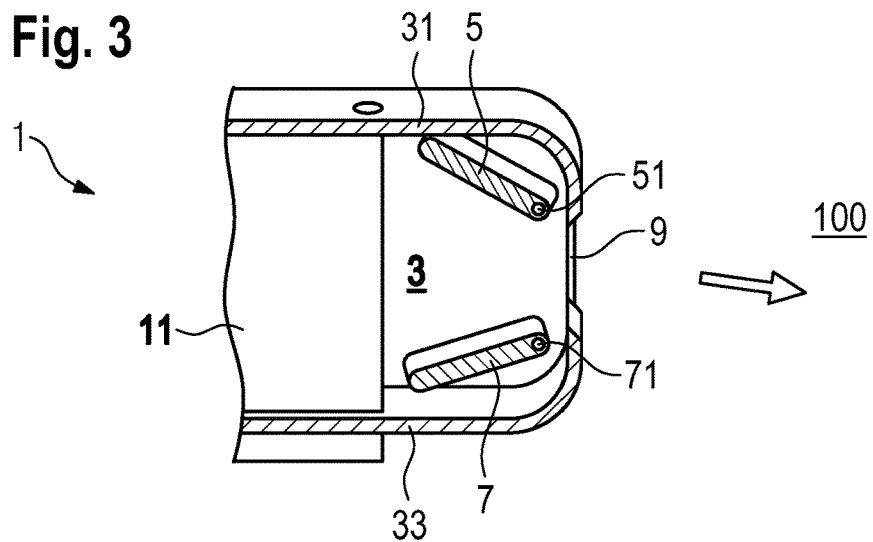
FIG. 3 is a diagrammatic sectional view of the air outlet device in accordance with the exemplary embodiment of the present invention in a second air guiding position.
Figure 4:
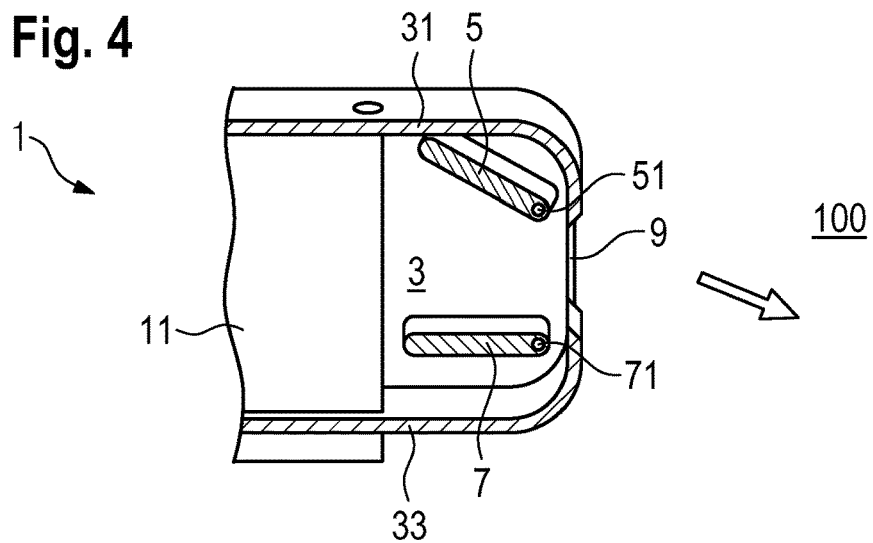
FIG. 4 is a diagrammatic sectional view of the air outlet device in accordance with the exemplary embodiment of the present invention in a third air guiding position.

With reference to FIGS. 2, 3 and 4, a function or actuation of the first air guiding element 5 and the second air guiding element 7 will now be described, in particular. In FIG. 2, both the first air guiding element 5 and the second air guiding element 5 are situated in a starting position or end position, in other words in a rest position, in which the first air guiding element 5 and the second air guiding element 7 are pivoted to a maximum extent in the direction of the respective adjacent wall 31, 33 of the air duct 3 and come into contact with it. In said position of the first air guiding element 5 and the second air guiding element 7, an outlet of air from the air outlet opening 9 takes place in the horizontal direction which is indicated by way of the arrow in FIG. 2.

FIG. 3 shows a position of the air outlet device, in the case of which position the first air guiding element 5 is situated in its end position and the second air guiding element 7 is pivoted away somewhat from the wall 33 of the air duct 3. In other words, the free end of the second air guiding element 7 is pivoted upward somewhat. As a result, this leads to influencing of the exiting air flow in such a way that the exiting air flow is directed somewhat downward, as shown by way of the arrow.

FIG. 4 shows a position of the air outlet device, in the case of which position the second air guiding element 7 is pivoted virtually into a horizontal position and the first air guiding element 5 is still situated in its end position. As a result, a more pronounced deflection of the air flow downward takes place in comparison with the position which is shown in FIG. 3, as shown by way of the arrow in FIG. 4.

Here, the pivoting of the second air guiding element 7 can take place in stages or in an infinitely variable manner. FIGS. 3 and 4 show two positions of the second air guiding element 7 merely by way of example. The second air guiding element 7 serves for positional control of the exiting air flow in an air deflection range downward, the first air guiding element 5 remaining in the end position and not being moved.

In order to deflect the exiting air flow upward, starting from the position which is shown in FIG. 2, the second air guiding element 7 conversely remains in its end position and the first air guiding element 5 is pivoted correspondingly.

By way of the pivoting according to the invention in opposite directions of the first air guiding element and the second air guiding element, as described with reference to FIGS. 2 and 4, the direction of the exiting air flow can be controlled in a suitable manner, without excessively restricting the duct cross section 3 by way of the air guiding elements 5, 7. This is achieved, in particular, by virtue of the fact that in each case one of the air guiding elements 5, 7 remains in its end position, whereas merely the other one of the air guiding elements 5, 7 is pivoted.

Here, in the case of an arrangement of the air guiding device 1 which is rotated by 90°, the air flow to the left and right can be influenced correspondingly.

The first air guiding element 5 and the second air guiding element 7 can be provided with a drive independently of one another and can accordingly be driven independently of one another. The drive can take place, for example, by way of two electric motors which are actuated correspondingly via a control device. A switching mechanism is also contemplated which enables the drive of either the first air guiding element 5 or the second air guiding element 7 by way of only one electric motor.

Figure 5:
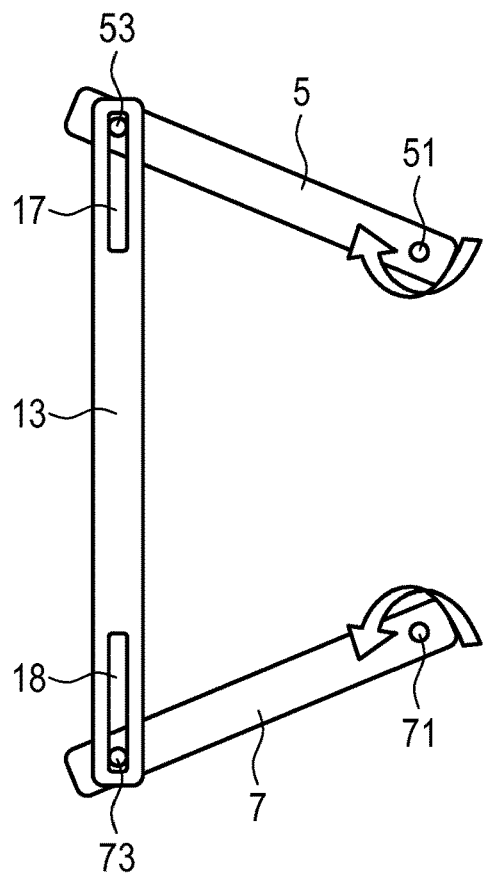
FIG. 5 is a diagrammatic view of a drive kinematic arrangement of the air outlet device in accordance with the exemplary embodiment of the present invention in a first air outlet position.
Figure 6:
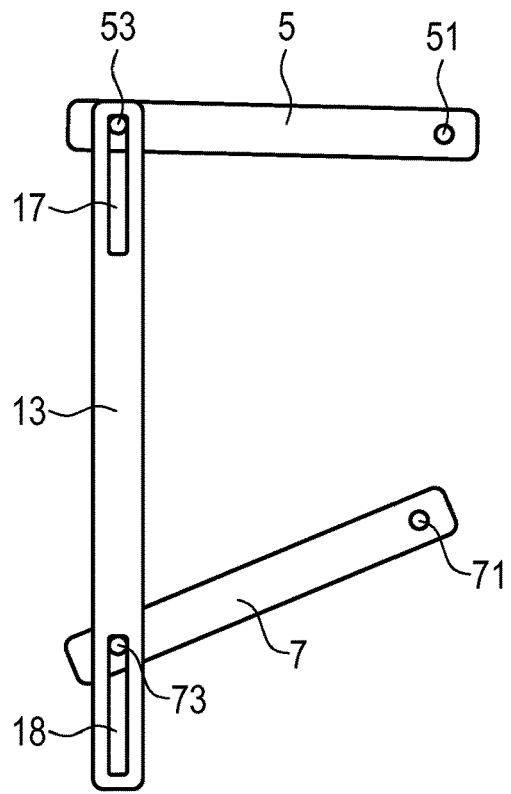
FIG. 6 is a diagrammatic view of the drive kinematic arrangement of the air outlet device in accordance with the exemplary embodiment of the present invention in the third air guiding position.

As an alternative, the first air guiding element 5 and the second air guiding element 7 can be coupled kinematically via a link/slotted guide combination in such a way that only the respective one air guiding element is pivoted in the two air deflection ranges (upward and downward in the figures). A solution of this type is shown in FIGS. 5 and 6. Here, the two air guiding elements 5 and 7 are in engagement with or coupled to a link element 13 at their ends which are remote from the pivot axis 51 and 71. In particular, a slotted guide 17, 18 is configured at each end of the link element 13, into which slotted guide 17, 18 a pin 53, 73 of the first air guiding element 5 and the second air guiding element 7 engages. The link element 13 can be moved substantially translationally in the vertical direction by way of a drive device. If the link element 13 is moved downward, the first air guiding element 5 moves correspondingly, that is to say the first air guiding element 5 is pivoted about the pivot axis 51 counter to the clockwise direction. If the link element 13 is moved upward, the second air guiding element 7 moves correspondingly, that is to say the second air guiding element 7 is pivoted about the pivot axis 71 in the clockwise direction. Furthermore, the air guiding elements 5 and 7 are prestressed in the direction of the associated wall 31 and 33, respectively, in each case by way of a spring device, as indicated by way of the arrows in FIG. 5. If, for example, the link element 13 is moved downward, as shown in FIG. 6, the link element 13 pulls the free end of the first air guiding element 5 downward counter to the prestressing force of the spring, after the pin 53 engages with one end of the slotted guide 17. At the same time, the second air guiding element 7 does not move, since the pin 73 of the second air guiding element 7 can move freely in the slotted guide 18. If the link element 13 is moved back upward from the position which is shown in FIG. 6, the second air guiding element 7 first of all does not move while the associated pin 73 is moved in the slotted guide 18. During this, as a result of the prestressing force of the spring device, the first air guiding element 5 pivots upward, however, as far as the stop on the wall 31, with the result that the state of FIG. 5 is achieved again, in which the two air guiding elements 5 and 7 are situated in the end position. The drive (not shown in FIGS. 5 and 6) of the link element 13 can be, for example, a manually actuable lever mechanism.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An air outlet device for feeding air into a vehicle interior in a directionally controlled manner, comprising:
an air duct;
a first pivotable air guiding element; and
a second pivotable air guiding element, wherein
the first air guiding element and the second air guiding element are configured to form, together with an air outlet opening, an air outlet nozzle, and
the first air guiding element and the second air guiding element are configured such that they are pivotable in opposite directions for the purpose of directional control of an air outlet flow,
wherein the first air guiding element and the second air guiding element are pivotable oppositely between a rest position and an air guiding position,
wherein the first air guiding element and the second air guiding element are prestressed in opposite directions toward their respective rest positions, and
wherein the first air guiding element and the second air guiding element are configured to pivot independently from each other,
wherein the first air guiding element and the second air guiding element are pivotable about two axes which are spaced apart and parallel to each other.

2. The air outlet device according to claim 1, wherein the first air guiding element and the second air guiding element are configured adjacently with respect to the air outlet opening.

3. The air outlet device according to claim 2, wherein a height of the air duct is greater than a height of the air outlet opening.

4. The air outlet device according to claim 3, wherein an air guiding device is provided in the air duct upstream of the first air guiding element and the second air guiding element in an air flow direction, which air guiding device is adapted to change an air flow direction in the air duct.

5. The air outlet device according to claim 4, wherein the air guiding device includes louvers which is pivotable transversely with respect to a pivoting direction of the first air guiding element and the second air guiding element.

6. The air outlet device according to claim 1, wherein the first air guiding element and the second air guiding element are pivoted to a maximum extent in a direction of a wall of the air duct in the rest position.

7. The air outlet device according to claim 1, wherein the first air guiding element and the second air guiding element are in contact with the wall of the air duct in their respective rest position.

8. The air outlet device according to claim 1, wherein in each case one of the first air guiding element and the second air guiding element is pivotable in its air guiding positional range in order to control a direction of the air outlet flow, while the other one of the first air guiding element and the second air guiding element is situated in its rest position.

9. An air outlet device for feeding air into a vehicle interior in a directionally controlled manner, comprising:
an air duct;
a first pivotable air guiding element; and
a second pivotable air guiding element, wherein
the first air guiding element and the second air guiding element are configured to form, together with an air outlet opening, an air outlet nozzle, and
the first air guiding element and the second air guiding element are configured such that they are pivotable in opposite directions for the purpose of directional control of an air outlet flow,
wherein the first air guiding element and the second air guiding element are pivotable oppositely between a rest position and an air guiding position,
wherein the first air guiding element and the second air guiding element are prestressed in opposite directions toward their respective rest positions, and
wherein a height of the air duct is greater than a height of the air outlet opening.

10. An air outlet device for feeding air into a vehicle interior in a directionally controlled manner, comprising:
an air duct;
a first pivotable air guiding element; and
a second pivotable air guiding element, wherein
the first air guiding element and the second air guiding element are configured to form, together with an air outlet opening, an air outlet nozzle, and
the first air guiding element and the second air guiding element are configured such that they are pivotable in opposite directions for the purpose of directional control of an air outlet flow,
wherein the first air guiding element and the second air guiding element are pivotable oppositely between a rest position and an air guiding position,
wherein the first air guiding element and the second air guiding element are prestressed in opposite directions toward their respective rest positions, and
wherein an air guiding device is provided in the air duct upstream of the first air guiding element and the second air guiding element in an air flow direction, which air guiding device is adapted to change an air flow direction in the air duct.

11. The air outlet device according to claim 10, wherein the air guiding device includes louvers which is pivotable transversely with respect to a pivoting direction of the first air guiding element and the second air guiding element.

* * * * *